(12) United States Patent
Zhang et al.

(10) Patent No.: US 12,092,599 B2
(45) Date of Patent: Sep. 17, 2024

(54) ONLINE MONITORING DEVICE AND METHOD FOR FOULING AND SLAGGING BASED ON CAPACITANCE PRINCIPLE DIFFERENTIAL MEASUREMENT

(71) Applicant: Taiyuan University of Technology, Taiyuan (CN)

(72) Inventors: Jiajie Zhang, Taiyuan (CN); Jiansheng Zhang, Taiyuan (CN); Yanwei Chen, Taiyuan (CN); Suxia Ma, Taiyuan (CN); Dapeng Bi, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 358 days.

(21) Appl. No.: 17/433,150

(22) PCT Filed: Aug. 10, 2020

(86) PCT No.: PCT/CN2020/108104
§ 371 (c)(1),
(2) Date: Aug. 23, 2021

(87) PCT Pub. No.: WO2021/052055
PCT Pub. Date: Mar. 25, 2021

(65) Prior Publication Data
US 2022/0155249 A1 May 19, 2022

(30) Foreign Application Priority Data
Sep. 16, 2019 (CN) .......................... 201910871412.5

(51) Int. Cl.
*G01N 27/22* (2006.01)
*G01K 7/00* (2006.01)
*F23J 1/00* (2006.01)

(52) U.S. Cl.
CPC ............... *G01N 27/22* (2013.01); *G01K 7/00* (2013.01); *F23J 1/00* (2013.01)

(58) Field of Classification Search
CPC .. G01N 27/22; G01K 7/00; G01K 7/34; F23J 1/00; G01B 7/08
(Continued)

(56) References Cited

U.S. PATENT DOCUMENTS 10,107,221 B2 * 10/2018 Wienand .............. F02D 41/1466
2006/0165153 A1 * 7/2006 Tillman .................... G01K 1/16
374/185
(Continued)

FOREIGN PATENT DOCUMENTS

CN 201449245 U * 5/2010
CN 102253081 A 11/2011
(Continued)

OTHER PUBLICATIONS

Jingqi Peng et al., Research on the detection of fouling and slagging in cold state based on capacitance principle. 2020 IOP Conf. Ser.: Mater. Sci. Eng. 721 012018 (Year: 2020).*
(Continued)

*Primary Examiner* — Lee E Rodak
*Assistant Examiner* — Demetrius R Pretlow
(74) *Attorney, Agent, or Firm* — HAUPTMAN HAM, LLP (57) ABSTRACT

An online monitoring device for fouling and slagging based on capacitance principle differential measurement includes multiple measuring devices arranged at the same height of the boiler heating surface. Each measuring device includes a fixed sleeve and a sensor, one end of the fixed sleeve is fixed on the boiler heating surface, the sensor is connected with the fixed sleeve through screw threads, the end of the sensor near the boiler is equipped with a measuring probe.

(Continued)

When measuring the thickness of ash residue on the monitoring surface, three sets of the measuring devices are at the same height of the monitoring surface. Each sensor is adjusted at a different position in the corresponding fixed sleeve to realize the differential measuring on ash residue thickness. Thus, the thickness of ash residue on the monitoring surface can be calculated based on the measured capacitance by applying the capacitance formula of planar capacitor.

5 Claims, 4 Drawing Sheets

(58) Field of Classification Search
USPC .......................................................... 324/686
See application file for complete search history.

(56) References Cited

U.S. PATENT DOCUMENTS

| 2016/0017830 A1* | 1/2016 | Wienand | G01N 15/06 73/23.31 |
| 2022/0155249 A1* | 5/2022 | Zhang | G01K 7/00 |

FOREIGN PATENT DOCUMENTS

| CN | 103024357 A | | 4/2013 | |
| CN | 104501204 A | * | 4/2015 | |
| CN | 204329060 U | * | 5/2015 | |
| CN | 204329064 U | * | 5/2015 | |
| CN | 110631465 A | * | 12/2019 | ............... G01B 7/08 |
| WO | WO-2021052055 A1 | * | 3/2021 | ............... G01B 7/08 |

OTHER PUBLICATIONS

Ban et al., A novel capacitance sensor for fireside corrosion measurement. Review of Scientific Instruments 80, 115107 (2009); doi: 10.1063/1.3262500 (Year: 2009).*
CN 201449245 U english translation (Year: 2010).*
CN 204329060 U english translation (Year: 2015).*
International Search Report issued in corresponding International Application No. PCT/CN2020/108104; mailed Oct. 29, 2020; State Intellectual Property Office of the P.R. China, Beijing, China, 8 pgs.
Written Opinion issued in corresponding International Application No. PCT/CN2020/108104; mailed Oct. 29, 2020; State Intellectual Property Office of the P.R. China, Beijing, China, 8 pgs.
First Office Action issued in corresponding Chinese Application No. 201910871412.5; mailed Jan. 6, 2021; State Intellectual Property Office of the P.R. China, Beijing, China, 10 pgs.
Search Report issued in corresponding Chinese Application No. 201910871412.5; mailed Dec. 27, 2020; State Intellectual Property Office of the P.R. China, Beijing, China, 2 pgs.
Iu, Yan-ni et al., "Study on Nonmetal Thickness Test Using Capacitance Sensor", Transducer and Microsystem Technologies, vol. 25, No. 1; dated Dec. 31, 2006; 3 pgs.

* cited by examiner

ONLINE MONITORING DEVICE AND METHOD FOR FOULING AND SLAGGING BASED ON CAPACITANCE PRINCIPLE DIFFERENTIAL MEASUREMENT

RELATED APPLICATIONS

The present application is a U.S. National Phase of International Application Number PCT/CN2020/108104, filed Aug. 10, 2020, and claims the priority of Chinese Application No. 201910871412.5, filed Sep. 16, 2019.

TECHNICAL FIELD

The present invention relates generally to monitoring of the boiler equipment, and relates more particularly to an online monitoring device and method for fouling and slagging based on capacitance principle differential measurement.

BACKGROUND

In the industrial equipment with coal as fuel, such as the utility boiler, the waste heat boiler of coal gasifier and so on, radiation or convection heat exchanger is usually used to absorb the sensible heat of high temperature gas produced by combustion. Due to the minerals and inorganic components in coal being transformed into the ash residue after combustion, a large number of ash particles are usually entrained within the high temperature gas. When the gas flows through the heating surface of furnace, the entrained ash particles will deposit on the heating surface and then cause the phenomenon of fouling and slagging. The slagging phenomenon mostly occurs on the heating surface of radiation heat exchanger, such as the furnace water wall in the utility boiler, the water wall of radiant syngas cooler in the coal gasifier and so on, where the gas temperature generally exceeds 1000° C. and the ash particles exist in a molten state. The molten ash particles contact the water wall, then solidify and stick to the wall. Gradually, the slagging on the heating surface will be caused. The fouling phenomenon mainly occurs on the heating surface of convection heat exchanger, where the gas temperature is lower than the softening temperature of coal ash. Therefore, the ash particles within the gas exist in a solid state. The solid ash particles deposit on the heating surface and gradually cause the fouling phenomenon.

Especially in the waste heat boiler of coal gasifier, since the high temperature gas from the gasification chamber contains a large number of molten ash particles, the fouling and slagging on the heating surface are more prominent. When the fouling and slagging happen on the heating surface, it will lead to the deterioration of heat transfer and then reduce the unit efficiency. Excessive fouling and slagging can evenly cause the ash and slag blocking in the gas channels, and then lead to the shutdown of the unit. Therefore, realizing the online monitoring on the growth process of ash and slag on the heating surface is very important to ensure the safe operation of equipment. At present, the online monitoring methods for fouling and slagging can be divided into two categories: direct monitoring and indirect monitoring.

The direct monitoring uses the apparatus to detect directly the condition of fouling and slagging on the heating surface. For example, the CN Pat. No. 103024357 disclosed an automatic rotating lifting monitoring system to detect the fouling and slagging in the furnace of utility boiler. The system comprised a fixed bracket, a lifting table, an imaging system (including CCD camera and optical lens), a cooling device, and a driving mechanism. During the operation process, the lifting table descended and then the optical lens of imaging system stuck into the furnace. Thus, the condition of fouling and slagging in the furnace may be observed from multi-angle by rotating the lens. Although this system can realize the direct monitoring on the fouling and slagging, it had not been used in actual production because the system contained many complex machineries, as well as the special cooling equipment.

The indirect monitoring generally measures the flow or the heat transfer parameters in the furnace, and then detects indirectly the condition of fouling and slagging on the heating surface. For example, the CN Pat. No. 102253081 provided a method for monitoring the fouling condition in a utility boiler by measuring the furnace temperature. This method measured the furnace outlet gas temperature and water wall temperature by using the acoustics principle, and then realized the detection of the fouling condition in furnace based on the established monitoring model. However, due to the propagation characteristics of sound wave highly relating to the temperature and components of flue gas, the measuring accuracy of this method was difficult to be guaranteed when the furnace environment changed. In addition, other types of indirect monitoring methods, such as wall heat flow meter, thermodynamic equilibrium calculation and so on, are also limited by the established monitoring model. When the operation condition of the boiler is stable, the monitoring system has a high accuracy. However, when the coal category or the operation load changes, the accuracy of the monitoring model decreases significantly, thereby the condition of the fouling and slagging on heating surface cannot be monitored effectively.

SUMMARY OF THE INVENTION

In order to solve the problems of above monitoring methods, the present invention provides an online monitoring device and method for fouling and slagging based on capacitance principle differential measurement.

An online monitoring device for fouling and slagging based on capacitance principle differential measurement, comprising multiple measuring devices being arranged at the same height of the boiler heating surface. The measuring device includes the fixed sleeve and the sensor. One end of the fixed sleeve is fixed on the boiler heating surface. The sensor is nested in the fixed sleeve and connected with the fixed sleeve through screw threads. The end of the sensor near the boiler is equipped with a measuring probe.

The measuring probe includes the central electrode, the ring electrode, the insulating ceramic and the thermometric element. The central electrode has a circular cross section. The ring electrode is arranged around the central electrode. The insulating ceramic is arranged on the outside of the ring electrode and also between the ring electrode and the central electrode. The thermometric element is arranged in the insulating ceramic to measure the temperature of the measuring probe.

Advantageously, in the online monitoring device for fouling and slagging, the fixed sleeve comprises the sleeve and the fixed flange, and the inner wall of the sleeve is arranged with the internal thread. The sensor comprises the measuring rod and the meter case. The measuring rod is provided with the external thread which is matched with the internal thread of the sleeve. The meter case is connected with one end of the measuring rod. The measuring probe is arranged in the other end of the measuring rod. The measuring probe is connected with the electrocircuit in the meter case by the lead wire through the measuring rod. The periphery of the measuring rod is connected with the threaded flange and the lock nut through screw threads. The threaded flange is used to connect the fixed flange and the lock nut is used to lock the threaded flange.

Advantageously, in the online monitoring device for fouling and slagging, the sleeve is made of the refractory metal.

Advantageously, in the online monitoring device for fouling and slagging, comprising three measuring devices, and the distances between the end of sensor and the end of fixed sleeve are different for each measuring device.

Advantageously, in the online monitoring device for fouling and slagging, the high thermal conductivity material is filled between the fixed sleeve and the monitoring surface.

The present invention also provides an online monitoring method for fouling and slagging based on capacitance principle differential measurement, comprising the steps of:

S1. adjusting the distance between the end of measuring probe and the end of fixed sleeve so that the distances for each measuring device are different, and recording each distance value;

S2. installing the measuring devices on the monitoring surface of the boiler, with the end of fixed sleeve being flush with the monitoring surface, and filling the high thermal conductivity material between the fixed sleeve and the monitoring surface;

S3. recording the capacitance value C of each sensor, substituting the capacitance value C and the corresponding distance value into the calculation formulas of ring capacitance, and then obtaining the thickness of ash residue $\delta$. The calculation formulas are as follows:

$$C = \frac{\pi(\varepsilon_1 + \varepsilon_2)}{\frac{1}{a}\ln\frac{2}{a} + \frac{1}{b}\ln\frac{2}{b} - \frac{\varepsilon_1 - \varepsilon_2}{\varepsilon_1 + \varepsilon_2}A};$$

$$A = \frac{2\delta}{a^2} - \frac{\sqrt{a^2 + (2\delta)^2}}{a^2} + \frac{1}{a}\ln\frac{2\delta}{a + \sqrt{a^2 + (2\delta)^2}} + \frac{\sqrt{b^2 + (2\delta)^2}}{\sqrt{b(2a + b + 2d)}} - \frac{2\delta}{b(2a + b + 2d)} + \frac{a+d}{b(2a + b + 2d)}\ln\frac{b + \sqrt{b^2 + (2\delta)^2}}{2\delta};$$

Where, C means the capacitance with the unit as F. $\varepsilon_1$, $\varepsilon_2$ are the dielectric constants of the gas and ash residue, respectively. a is the radius of the central electrode. b is the width of the ring electrode. d is the distance between the central electrode and the ring electrode. $\delta$ is the thickness of the ash residue.

Advantageously, in the online monitoring method for fouling and slagging, the number of measuring devices is no less than three.

The present invention providing the following advantages:

1. Compared with the indirect monitoring methods by measuring the flow or heat transfer parameters, the measuring probe of sensor according to the present invention is contacted directly with the ash residue, thereby the present monitoring for fouling and slagging has a higher measurement accuracy.

2. The previous direct monitoring methods, such as imaging in furnace as stated above, need many complex machineries and auxiliary equipments to assure the safe of the monitoring device. Comparatively, the present invention adopts the capacitance principle for monitoring the fouling and slagging, therefore it has the advantages of reliable equipment, simple structure, convenient operation, high cost effective and so on.

3. According to the present invention, the fouling and slagging on the monitoring surface is measured in a differential manner. By adjusting the position of the sensor in the fixed sleeve, the differential measuring for the ash residue thickness is realized. The differential measurement in the present invention may effectively eliminate the influences of variable working conditions on the measurement results, such as the variations of coal category, boiler load, ash residue component and so on.

REFERENCE SIGNS LIST (1) measuring device
(2) fixed sleeve
(3) sensor
(4) monitoring surface
(5) high thermal conductivity material
(6) ash residue
(7) water wall
(8) waste heat boiler
(21) fixed flange
(22) sleeve
(23) internal thread
(30) meter case
(31) measuring rod
(32) threaded flange
(33) lock nut
(34) external thread
(35) measuring probe
(36) central electrode
(37) ring electrode
(38) insulating ceramic
(39) thermometric element

DETAILED DESCRIPTION OF EMBODIMENTS

The present invention is explained below in detail with reference to the accompanying drawings. It is important to point out that the present invention is not limited to the following embodiment. The constituent elements disclosed in the following embodiment include those that can be easily assumed by persons skilled in the art, that are substantially identical, and that are within so-called equivalents.

The embodiment of the present invention provides an online monitoring device for fouling and slagging based on capacitance principle differential measurement, which comprises three measuring devices (1). These measuring devices are arranged at the same height of the heating surface in a boiler.

Figure 1:
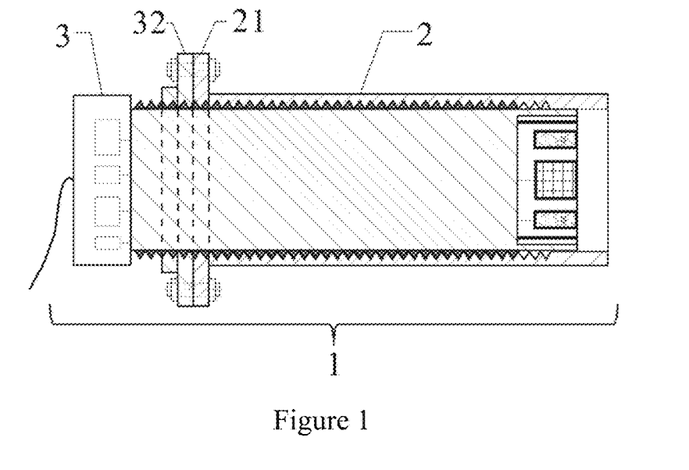
FIG. 1 is a configuration diagram of an online monitoring device for fouling and slagging based on capacitance principle differential measurement according to an embodiment of the present invention.

As shown in FIG. 1, the measuring device (1) comprises the fixed sleeve (2) and the sensor (3). One end of the fixed sleeve (2) is fixed on the boiler heating surface. The sensor (3) is nested in the fixed sleeve (2) and connected with the fixed sleeve (2) through screw threads.

Figure 2:
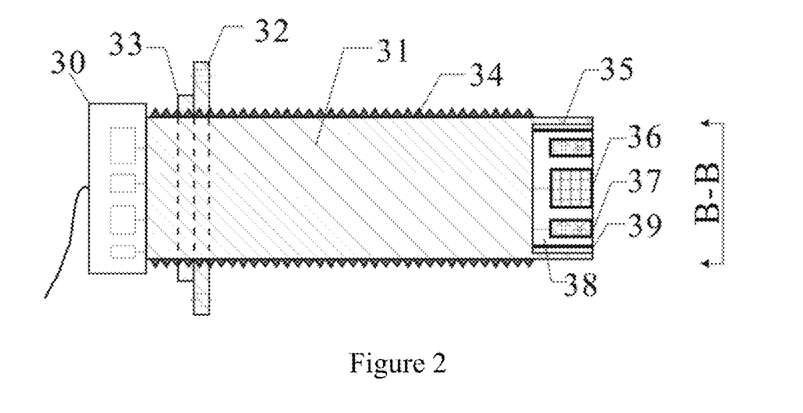
FIG. 2 is a schematic diagram of the sensor according to an embodiment of the present invention.
Figure 3:
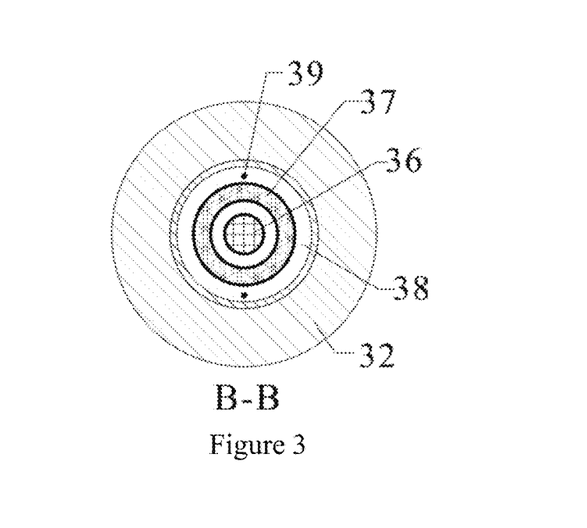
FIG. 3 is the B-B view of FIG. 2.

As shown in FIG. 2 and FIG. 3, the sensor (3) comprises the measuring rod (31) and the meter case (30). The meter case (30) is connected with one end of the measuring rod (31). The measuring probe (35) is arranged in the other end of the measuring rod (31) near the boiler. The measuring probe (35) comprises the central electrode (36), the ring electrode (37), the insulating ceramic (38) and the thermometric element (39). The central electrode (36) has a circular cross section. The ring electrode (37) is arranged around the central electrode (36). The insulating ceramic (38) is arranged on the outside of the ring electrode (37) and also between the ring electrode (37) and the central electrode (36). The thermometric element (39) is arranged in the insulating ceramic (38) to measure the temperature of the measuring probe (35), in order to make temperature compensation for the monitoring results. The measuring rod (31) is provided with a wire guide hole, through which the measuring probe (35) is connected with the electrocircuit in the meter case (30) by the lead wire. The measuring rod (31) is grounded to shield the measuring probe (35).

Figure 4:
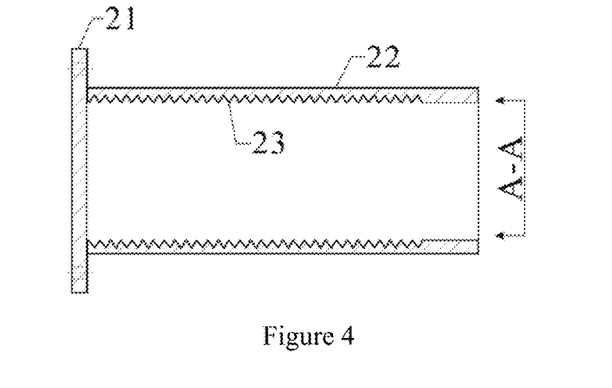
FIG. 4 is a schematic diagram of the fixed sleeve according to an embodiment of the present invention.
Figure 5:
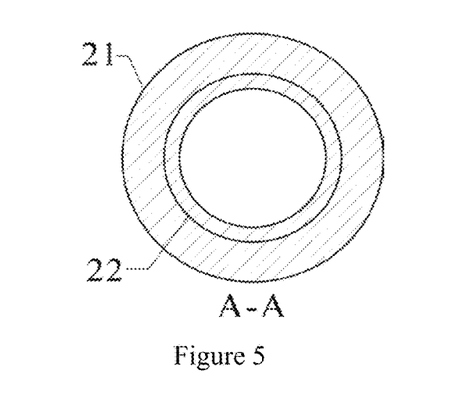
FIG. 5 is the A-A view of FIG. 4.

As shown in FIG. 4 and FIG. 5, the fixed sleeve (2) comprises the sleeve (22) and the fixed flange (21). The inner wall of the sleeve (22) is provided with the internal thread (23). Combined with FIG. 2, the measuring rod (31) is provided with the external thread (34), which is matched with the internal thread (23). The threaded flange (32) and the lock nut (33) are arranged on the peripheral of the measuring rod (31) through threaded connection. The threaded flange (32) is used to connect the fixed flange (21), and the lock nut (33) is used to lock the threaded flange (32). In the present embodiment, the sensor (3) is arranged in the fixed sleeve (2) through the thread. Thus, the distance between the measuring probe (35) and the end face of the fixed sleeve (2) can be adjusted by rotating the sensor (3). After the adjustment, the threaded flange (32) and the fixed flange (21) are bolted together to ensure that the sensor (3) and the fixed sleeve (2) are closely fitted. Finally, the lock nut (33) is tighten to the threaded flange (32), so as to fix the threaded flange (32) and lock the measuring rod (31). In a word, the monitoring device (1) in the present invention may adjust the sensor (3) to a different position within the fixed sleeve (2), namely, adjust the measuring distance and lock it.

When measuring the thickness of ash residue on the boiler heating surface, three measuring devices (1) are jointly installed at the same height of monitoring surface. In order to realize the differential measuring on ash residue thickness, among three measuring devices, each sensor (3) is adjusted at a different position in the corresponding fixed sleeve (2). Thus, the thickness of ash residue on the monitoring surface can be calculated based on the measured capacitance.

Further, in the present embodiment, the sleeve (22) is made of the refractory metal.

Figure 6:
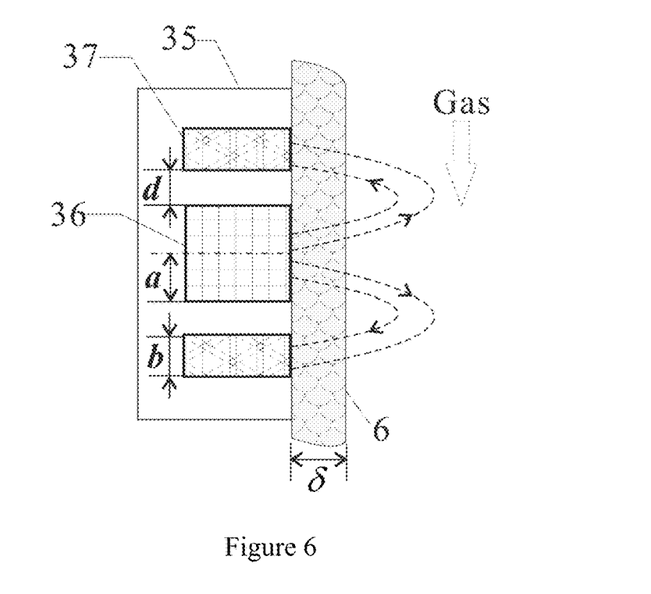
FIG. 6 is a schematic diagram of capacitance principle for measuring the ash residue according to an embodiment of the present invention.

Combined with FIG. 2, FIG. 3 and FIG. 6, the capacitance monitoring principle of the present invention is described as follows. The central electrode (36) and the ring electrode (37) constitute a planar capacitor. When an excitation signal is applied to the central electrode (36), the spatial electric field is formed on the end face of the measuring probe (35). The electric field line being emitted from the central electrode (36) goes into the ring electrode (37). When installing the monitoring devices at the heating surface, if the fouling and slagging occurs at the heating surface, the end face of the measuring probe (35) will contact directly with the ash residue (6). Thus, the electric field line will pass through the ash residue (6) and the gas. It results in that the space electric field of the planar capacitor is changed, accordingly, the measured capacitance value will be changed. Under the given size of the planar capacitor, the measured capacitance depends on the dielectric property decided together by the ash residue and gas. Based on the Gauss theorem and the electrostatic field boundary conditions, the capacitance formula for the planar capacitor can be deduced by using the mirror method, as Eqs. (i) and (ii).

$$C = \frac{\pi(\varepsilon_1 + \varepsilon_2)}{\frac{1}{a}\ln\frac{2}{a} + \frac{1}{b}\ln\frac{2}{b} - \frac{\varepsilon_1 - \varepsilon_2}{\varepsilon_1 + \varepsilon_2}A}; \quad (i)$$

$$A = \frac{2\delta}{a^2} - \frac{\sqrt{a^2 + (2\delta)^2}}{a^2} + \frac{1}{a}\ln\frac{2\delta}{a + \sqrt{a^2 + (2\delta)^2}} + \frac{\sqrt{b^2 + (2\delta)^2}}{\sqrt{b(2a+b+2d)}} - \frac{2\delta}{b(2a+b+2d)} + \frac{a+d}{b(2a+b+2d)}\ln\frac{b + \sqrt{b^2 + (2\delta)^2}}{2\delta}; \quad (ii)$$

Where, C means the capacitance with the unit as F. $\varepsilon_1$, $\varepsilon_2$ are the dielectric constants of the gas and ash residue, respectively. a is the radius of the central electrode (36). b is the width of the ring electrode (37). d is the distance between the central electrode (36) and the ring electrode (37). $\delta$ is the thickness of the ash residue.

In the actual application, due to the composition of coal category and the combustion condition in the furnace being complicated and changeable, it is hard to predict accurately the composition of the ash residue and the gas. Thus, the dielectric constants of ash residue and gas are unknown, and then the relationship between the measured capacitance and the ash residue thickness cannot be obtained. To solve this problem, the present invention adopts a differential measurement method to eliminate the influence of unknown dielectric constants. Since the heating surface in the boiler is usually arranged symmetrically, when the fouling and slagging occurs, the thicknesses of ash residue at the same height of heating surface are equal. Based on these, the present invention realizes a differential measuring on ash residue thickness by adjusting the position of the sensor in the fixed sleeve of the measuring device.

Figure 7:
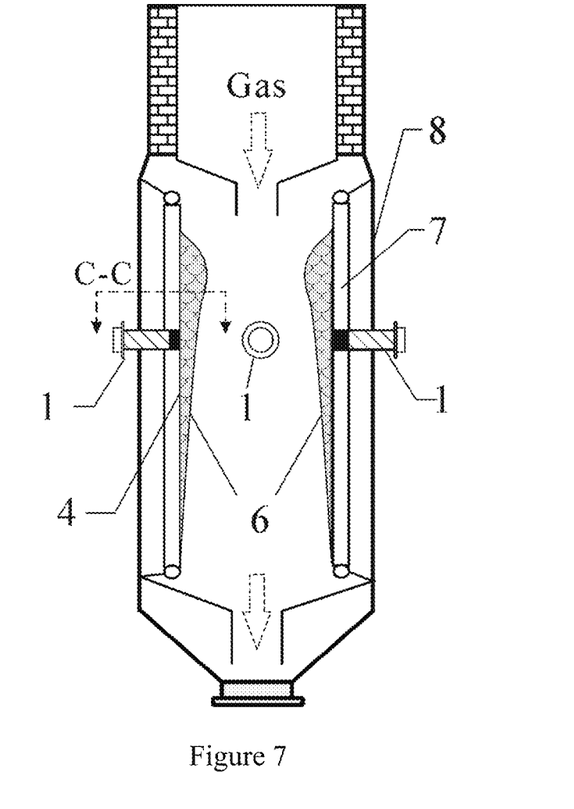
FIG. 7 is an installation diagram of the monitoring device on the water wall of waste heat boiler in a coal gasifier according to an embodiment of the present invention.

Combined with FIG. 1 and FIG. 7, taking the waste heat boiler (8) in a coal gasifier as an example, when measuring the thickness of ash residue (6) on the monitoring surface (4) of the water wall (7) in the furnace, three sets of measuring devices (1) are used jointly and installed at the same height of the monitoring surface (4).

Figure 8A:
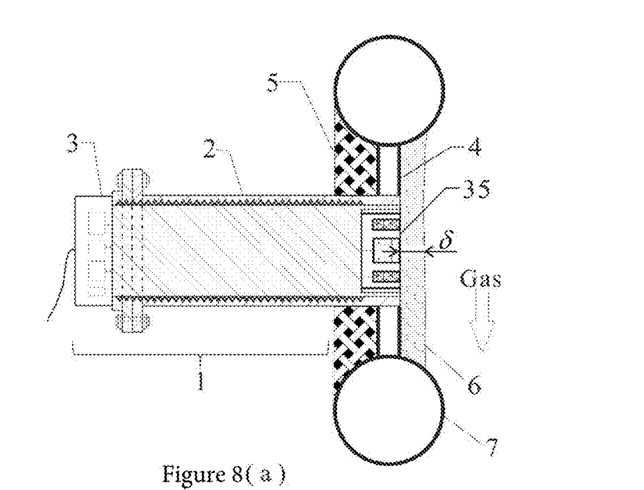
FIGS. 8(a)-8(c) are a schematic diagram of the differential measuring for the ash residue according to an embodiment of the present invention, which is the C-C view of FIG. 7.
Figure 8B:
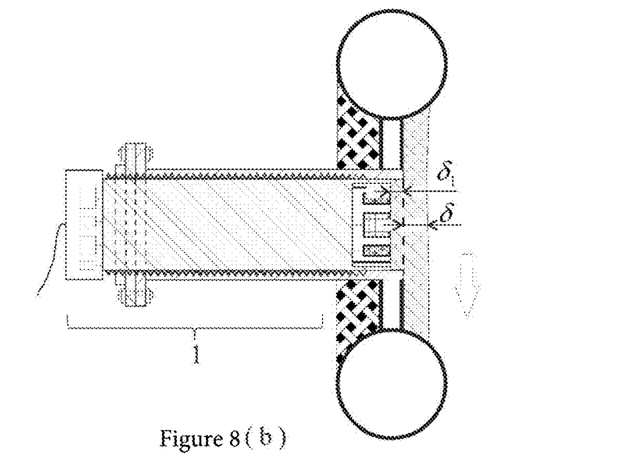
Figure 8C:
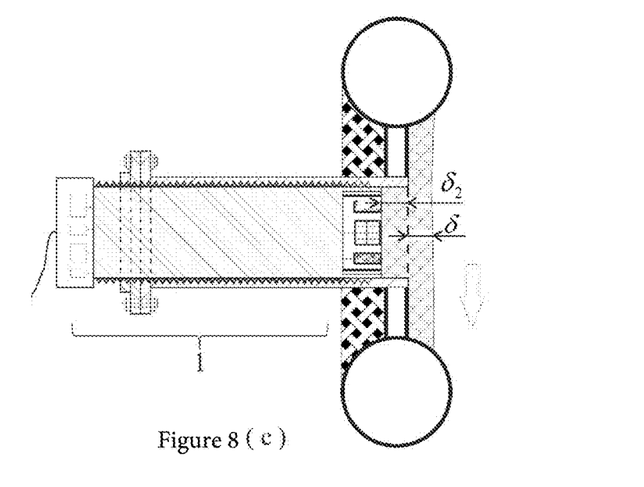

Combined with FIG. 7 and FIGS. 8(a)-8(c), the differential measuring process is as follows. The fixed sleeve (2) is installed on the monitoring surface (4), and the end of the fixed sleeve (2) is flush with the monitoring surface (4). The position of the sensor (3) in the fixed sleeve (2) can be adjusted through screw threads. As shown in FIG. 8(a), in the first set of measuring device (1), the end of the measuring probe (35) is flush with the monitoring surface (4). As shown in FIG. 8(b), in the second set of measuring device (1), the distance between the end of the measuring probe (35) and the monitoring surface (4) is adjusted as $\delta_1$. As shown in FIG. 8(c), in the third set of measuring device (1), the distance between the end of the measuring probe (35) and the monitoring surface (4) is adjusted as $\delta_2$. Since the ash residue thicknesses at the same height of the heating surface are equal, the following characteristics are provided: the ash residue thickness measured by the first set of measuring devices is $\delta$, which is the real thickness of ash residue on the monitoring surface, and the measured capacitance value is marked as $C_1$; the ash residue thickness measured by the second set of measuring devices is $\delta+\delta_1$, and the measured capacitance value is marked as $C_2$; the ash residue thickness measured by the third set of measuring devices is $\delta+\delta_2$, and the measured capacitance value is marked as $C_3$. Thus, the thicknesses and capacitances of ash residue measured by three sets of measuring devices are $(\delta, C_1)$, $(\delta+\delta_1, C_2)$, and $(\delta+\delta_2, C_3)$ respectively. Where, $\delta_1$ and $\delta_2$ (the distance between the end of the measuring probe and the monitoring surface) are known when the measuring devices are installed. Therefore, substituting three sets of parameters $(\delta, C_1)$, $(\delta+\delta_1, C_2)$, and $(\delta+\delta_2, C_3)$ into Eqs. (i) and (ii), three equations can be obtained with three variables as $\varepsilon_1, \varepsilon_2, \delta$. Then, the real thickness $\delta$ of ash residue can be obtained by solving the equations.

In addition, in the embodiment of the present invention, the number of measuring devices (1) may be more than three. Thus, multiple sets of parameters (Distance, Capacitances) can be measured, and the ash residue thickness $\delta$ can be obtained by substituting Eqs. (i) and (ii) and applying the least square method.

Refer to FIGS. 8(a)-8(c), the high thermal conductivity material (5) is filled between the fixed sleeve (2) and the monitoring surface (4). Thus, the monitoring device (1) can be cooled better by the monitoring surface (4) (namely, water wall), so as to avoid the thermal damage from high temperature gas.

Furthermore, the present invention also provides an online monitoring method for fouling and slagging based on capacitance principle differential measurement, which is realized by adopting the above monitoring device, specifically including the following steps:

S1. adjusting the distance between the end of measuring probe (35) and the end of fixed sleeve (2) so that the distances for each measuring device (1) are different, and recording each distance value;

S2. installing the measuring devices (1) on the monitoring surface (4) of the boiler, with the end of fixed sleeve (2) being flush with the monitoring surface (4), and filling the high thermal conductivity material (5) between the fixed sleeve (2) and the monitoring surface (4);

S3. recording the capacitance value C of each sensor (3), substituting the capacitance value C and the corresponding distance value into the calculation formulas of ring capacitance, and then obtaining the thickness of ash residue $\delta$.

The invention claimed is:

1. An online monitoring device for fouling and slagging based on capacitance principle differential measurement, comprising three measuring devices being arranged at the same height of a boiler heating surface of a boiler, wherein
each measuring device among the three measuring devices includes a fixed sleeve and a sensor, one end of the fixed sleeve is fixed on the boiler heating surface, the sensor is nested in the fixed sleeve and connected with the fixed sleeve through screw threads, the end of the sensor near the boiler is equipped with a measuring probe;

the measuring probe includes a central electrode, a ring electrode, a insulating ceramic and a thermometric element, the central electrode has a circular cross section, the ring electrode is arranged around the central electrode, the insulating ceramic is arranged on the outside of the ring electrode and also between the ring electrode and the central electrode, the thermometric element is arranged in the insulating ceramic to measure the temperature of the measuring probe; and the distances between the end of sensor and the end of fixed sleeve are different for each measuring device.

2. The online monitoring device according to claim 1, wherein
the fixed sleeve comprises a sleeve and a fixed flange, and an inner wall of the sleeve is arranged with an internal thread; and
the sensor comprises a measuring rod and a meter case, the measuring rod is provided with a external thread which is matched with the internal thread of the sleeve, the meter case is connected with one end of the measuring rod, the measuring probe is arranged in the other end of the measuring rod, the measuring probe is connected with a electrocircuit in the meter case by a lead wire through the measuring rod, the periphery of the measuring rod is connected with a threaded flange and a lock nut through screw threads, the threaded flange is used to connect the fixed flange and the lock nut is used to lock the threaded flange.

3. The online monitoring device according to claim 2, wherein the sleeve is made of a refractory metal.

4. An online monitoring method for fouling and slagging based on capacitance principle differential measurement, using an online monitoring device comprising multiple measuring devices being arranged at the same height of a boiler heating surface of a boiler, wherein
each measuring device among the multiple measuring devices includes a fixed sleeve and a sensor, one end of the fixed sleeve is fixed on the boiler heating surface, the sensor is nested in the fixed sleeve and connected with the fixed sleeve through screw threads, the end of the sensor near the boiler is equipped with a measuring probe, the measuring probe includes a central electrode, a ring electrode, a insulating ceramic and a thermometric element, the central electrode has a circular cross section, the ring electrode is arranged around the central electrode, the insulating ceramic is arranged on the outside of the ring electrode and also between the ring electrode and the central electrode, the thermometric element is arranged in the insulating ceramic to measure the temperature of the measuring probe, the method comprising:

adjusting a distance between the end of measuring probe and the end of fixed sleeve so that the distances for each measuring device are different, and recording each distance value;

installing the measuring devices on the monitoring surface of the boiler, with the end of fixed sleeve being flush with the monitoring surface, and filling the high thermal conductivity material between the fixed sleeve and the monitoring surface; and recording a capacitance value C of each sensor, substituting the capacitance value C and the corresponding distance value into the calculation formulas of ring capacitance, and then obtaining a thickness of ash residue δ, calculation formulas are as follows:

$$C = \frac{\pi(\varepsilon_1 + \varepsilon_2)}{\frac{1}{a}\ln\frac{2}{a} + \frac{1}{b}\ln\frac{2}{b} - \frac{\varepsilon_1 - \varepsilon_2}{\varepsilon_1 + \varepsilon_2}A};$$

$$A = \frac{2\delta}{a^2} - \frac{\sqrt{a^2 + (2\delta)^2}}{a^2} + \frac{1}{a}\ln\frac{2\delta}{a + \sqrt{a^2 + (2\delta)^2}} + \frac{\sqrt{b^2 + (2\delta)^2}}{\sqrt{b(2a + b + 2d)}} -$$

$$\frac{2\delta}{b(2a + b + 2d)} + \frac{a + d}{b(2a + b + 2d)}\ln\frac{b + \sqrt{b^2 + (2\delta)^2}}{2\delta};$$

where C is the capacitance in units of farads (F), $\varepsilon_1$, $\varepsilon_2$ are a dielectric constants of a gas and ash residue, respectively, a is the radius of the central electrode, b is the width of the ring electrode, d is the distance between the central electrode and the ring electrode, and δ is the thickness of the ash residue.

5. The online monitoring method according to claim 4, wherein the number of measuring devices is no less than three.

\* \* \* \* \*